July 11, 1950    Y. LATIEULE ET AL    2,515,047
WATERING SYSTEM
Filed April 9, 1947
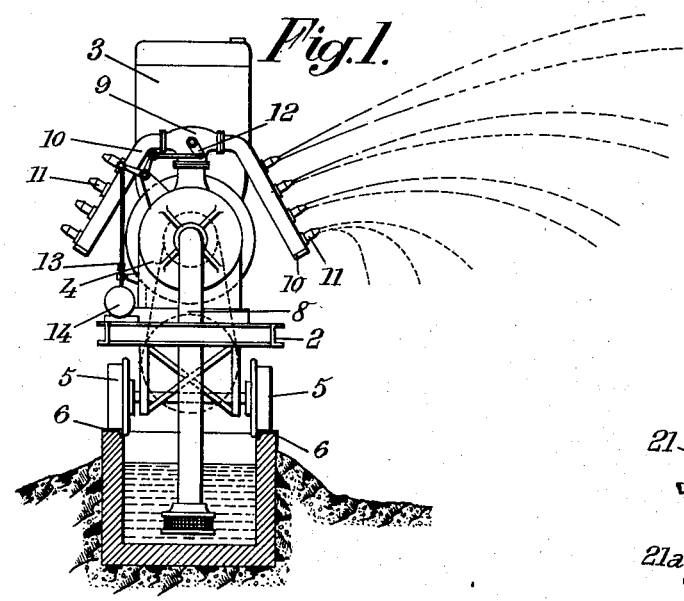
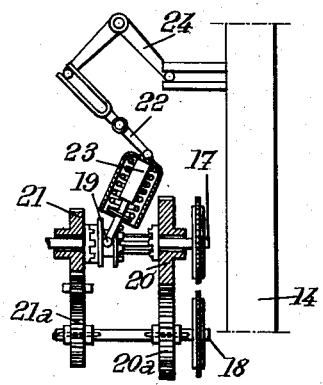
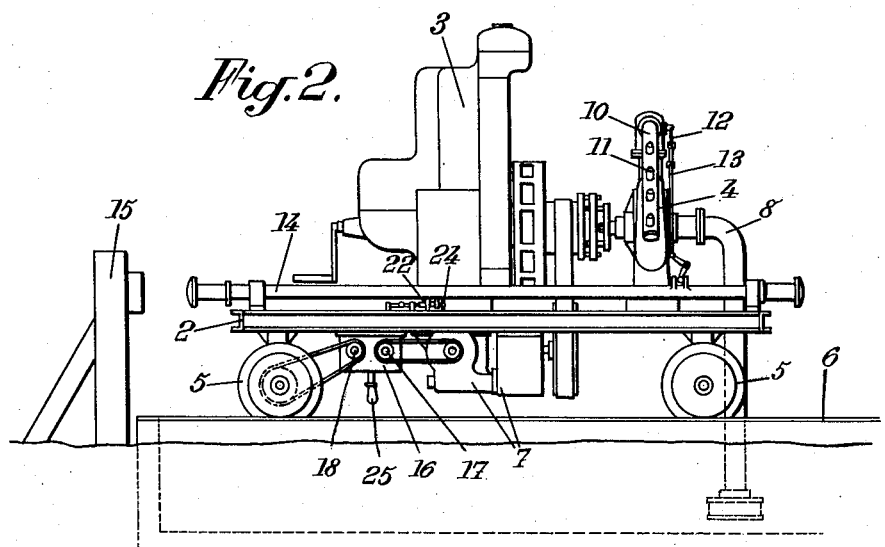
INVENTORS
YVES LATIEULE
HENRI BRICOUT
BY Lucke + Lucke
AGENTS Patented July 11, 1950

2,515,047

UNITED STATES PATENT OFFICE 2,515,047

WATERING SYSTEM

Yves Latieule and Henri Bricout, Paris, France, assignors to Compagnie Cherifienne des Textiles S. A., Safi (Maroc), a society of France Application April 9, 1947, Serial No. 740,320
In France April 10, 1946

3 Claims. (Cl. 299—52)

The present invention relates to watering systems.

Its chief object is to provide a system of this kind which is better adapted to meet the various requirements of practice than those used for the same purpose up to the present time.

It consists mainly in circulating along a channel filled with liquid and suitably located in the area to be irrigated a machine capable of pumping out the liquid from said channel, and projecting it so as to sprinkle this area therewith.

Other features of our invention will appear from following detailed description of a specific embodiment thereof with reference to the accompanying drawings given merely by way of example and in which:

Fig. 1 is an end elevational view, partly in section of a watering system according to our invention, the view being taken on the line I—I of Fig. 2.

Fig. 2 is a side elevational view of the watering system;

Fig. 3 is a plan view partly in section of the reversing mechanism.

As shown by the drawings, according to our invention, we provide, in a field to be watered, a channel 1, for instance of masonry or of reinforced concrete, the location and direction of which are suitably chosen, for instance as it will be hereinafter explained.

This channel is fed with water through any suitable means.

A watering machine essentially including a frame 2, a motor 3 and a water pump 4 is caused to run along this channel 1.

Preferably, the machine runs on flanged wheels 5 on two tracks 6 which may be constituted by the walls of channel 1, or preferably by rails extending along the tops of these walls.

Motor 3 is for instance constituted by an internal combustion engine, as shown by the drawing.

It might be constituted by an electric motor fed with current through any suitable means.

This motor is adapted to drive both pump 4 and wheels 5, the latter through the intermediate of a speed reducing gear 7.

Concerning the pump, its intake is connected to a suction pipe 8 which dips in channel 1 and the lower end of which is fitted with a strainer. The output of said pump is connected to a T conduit 9 leading to two pipes 10 provided with nozzles 11 of different respective diameters so that the respective jets they project are of decreasing strength, whereby a certain area of the ground on either side of the machine is sprinkled in a substantially uniform manner.

According to a particularly advantageous embodiment of our invention, the machine is arranged in such manner that it can water the ground only on one side for each direction of movement and it includes an automatic reversing gear.

For this purpose, the T conduit 9 is provided with a valve adapted to occupy two working positions for each of which it connects the pump to one of the two pipes 10 respectively. The arm 12 of this valve is controlled through link means 13 operated by displacement of a longitudinal rod 14, adapted to slide with respect to frame 2 and coming, at the end of the movement of the machine along the track in one direction, into contact with a fixed buffer 15.

We interpose between speed reducing gear 7 and wheels 5 a reversing gear 16 including, for instance a primary shaft 17 (Fig. 3) connected to the speed reducing gear, and a secondary shaft 18 connected to wheels 5, which shaft 18 can rotate either in the same direction of shaft 17 or in the opposed direction according as clutch member 19 couples it with pinion 20 or with pinion 21.

There might be a risk, if clutch member 19 were directly connected with reversing arm 22, itself connected with rod 14 through link means 23, of having the machine brought into neutral gear, at the end of a displacement in one direction, due to the low speed, which does not give said member the impetus necessary for reengaging in the other direction.

Consequently, clutch member 19 is connected with arm 22 through a spring 23 which always keeps said member in mesh with one of the pinions 20 and 21 and is capable of switching it suddenly from one to the other, when arm 22 is urged, even very slowly, by link means 24 operated by rod 14.

Furthermore, as it is necessary to be able to stop the wheels completely, in particular for starting motor 3, we provide the possibility of bringing clutch member 19 into neutral position, against the action of spring 23, by means of a lever 25.

Thus, through a judicious choice of the ratio of speed reducing gear 7, the machine can be started in the evening, at one end of channel 1 and found at the same place on the next morning, after one or several travels to and fro. As only one side is watered at a time, for instance the right hand side during the outward journey and the left hand side during the return journey, we avoid the accumulation of water which would take place at the time of reversal if the sprinkling were effected on both sides.

Of course, in the construction of a watering system according to our invention, we choose the location and direction of the channel, and also the type of pump, in such manner that the ground can be watered as uniformly and as fully as possible.

This watering system has many advantages, in particular that of a high efficiency of irrigation while avoiding losses of water by evaporation and infiltration to great depth without profit for the plants, and that of watering the ground by sprinkling, which is the normal way provided by nature.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. For use in connection with an irrigation channel provided with parallel rails along its edges, a watering machine which comprises, in combination, a wheeled frame running on said rails above said channel, a pump carried by said frame, a pipe carried by said frame to have its inner end dipping in the liquid in said channel and its upper end connected with the input of said pump, two sets of nozzles carried by said frame and directed transversely on either side thereof respectively, distributing means for connecting the output of said pump alternately with the set of nozzles directed on one side and with that directed on the opposite side, and a motor for driving both the wheels of said machine and said pump.

2. For use in connection with an irrigation channel provided with parallel rails along its edges, a watering machine which comprises, in combination, a wheeled frame running on said rails above said channel, a pump carried by said frame, a pipe carried by said frame to have its inner end dipping in the liquid in said channel and its upper end connected with the input of said pump, two sets of nozzles carried by said frame and directed transversely on either side thereof respectively, distributing means for connecting the output of said pump alternately with the set of nozzles directed on one side and with that directed on the opposite side, a motor for driving both the wheels of said machine and said pump, a reversing gear between said motor and said wheels, and cooperating means on said machine and at least one end of said rails for operating said reversing gear when said machine reaches said end of the rails, and simultaneously switching said distributing means from one position to the other.

3. For use in connection with an irrigation channel provided with a track along its edge, a watering machine which comprises, in combination, a wheeled frame adapted to run on said track, a motor on said frame for propelling it along said track, a pump carried by said frame and driven by said motor for drawing liquid from said channel, means on said frame connected with the delivery of said pump for sprinkling said liquid onto the ground on either one or the other side of said track, means for reversing the direction of propulsion of said wheeled frame by said engine, and means operative by said reversing means for controlling said sprinkling means to work on one side of said track for a given direction of displacement of said frame on said track and on the other side of said track for the opposed direction of displacement of said frame.

YVES LATIEULE.
HENRI BRICOUT.

REFERENCES CITED

The following references are of record in the file of this patent:

UNITED STATES PATENTS

| Number | Name | Date |
| --- | --- | --- |
| 1,084,842 | Bustin | Jan. 20, 1914 |
| 1,107,119 | Searle | Aug. 11, 1914 |
| 1,468,860 | Foley | Sept. 25, 1923 |
| 2,132,314 | Needler | Oct. 4, 1938 |
| 2,247,433 | Bolton | July 1, 1941 |
| 2,249,130 | Gunther | July 15, 1941 |

FOREIGN PATENTS

| Number | Country | Date |
| --- | --- | --- |
| 5,492 | Great Britain | Mar. 5, 1912 |
| 203,120 | Great Britain | Sept. 6, 1923 |